United States Patent [19]

Enochs et al.

[11] Patent Number: 4,560,058

[45] Date of Patent: Dec. 24, 1985

[54] CONTAINER HANDLING SYSTEM

[75] Inventors: Frank L. Enochs, Irving, Tex.; Michael B. Kohler, Richland, Wash.

[73] Assignee: Frito-Lay, Inc., Dallas, Tex.

[21] Appl. No.: 59,176

[22] Filed: Jul. 20, 1979

[51] Int. Cl.⁴ .............................................. B65G 47/26
[52] U.S. Cl. ................................ 198/426; 198/476.1; 198/803.14 A
[58] Field of Search ............... 198/426, 427, 430, 482, 198/429, 549, 562, 565, 569, 703, 796, 708, 655; 53/250

[56] References Cited

U.S. PATENT DOCUMENTS

| | | | |
|---|---|---|---|
| 956,036 | 4/1910 | Burr | 198/427 |
| 2,828,000 | 3/1958 | Hebert | 198/426 |
| 3,670,865 | 6/1972 | Garland | 198/655 |
| 4,052,838 | 10/1977 | Hilton et al. | 53/531 |

FOREIGN PATENT DOCUMENTS 300689  9/1932  Italy .................................... 198/430

*Primary Examiner*—Joseph E. Valenza
*Attorney, Agent, or Firm*—Bernard, Rothwell & Brown

[57] ABSTRACT

A container handling system for distributing a plurality of elongated articles, such as tubular containers, from a source wherein an indexing conveyor is positioned to receive individual articles in a horizontal position from a group of articles, and is adapted to align a plurality of articles along its top surface for intermittent unloading of a selected number of the articles.

7 Claims, 6 Drawing Figures

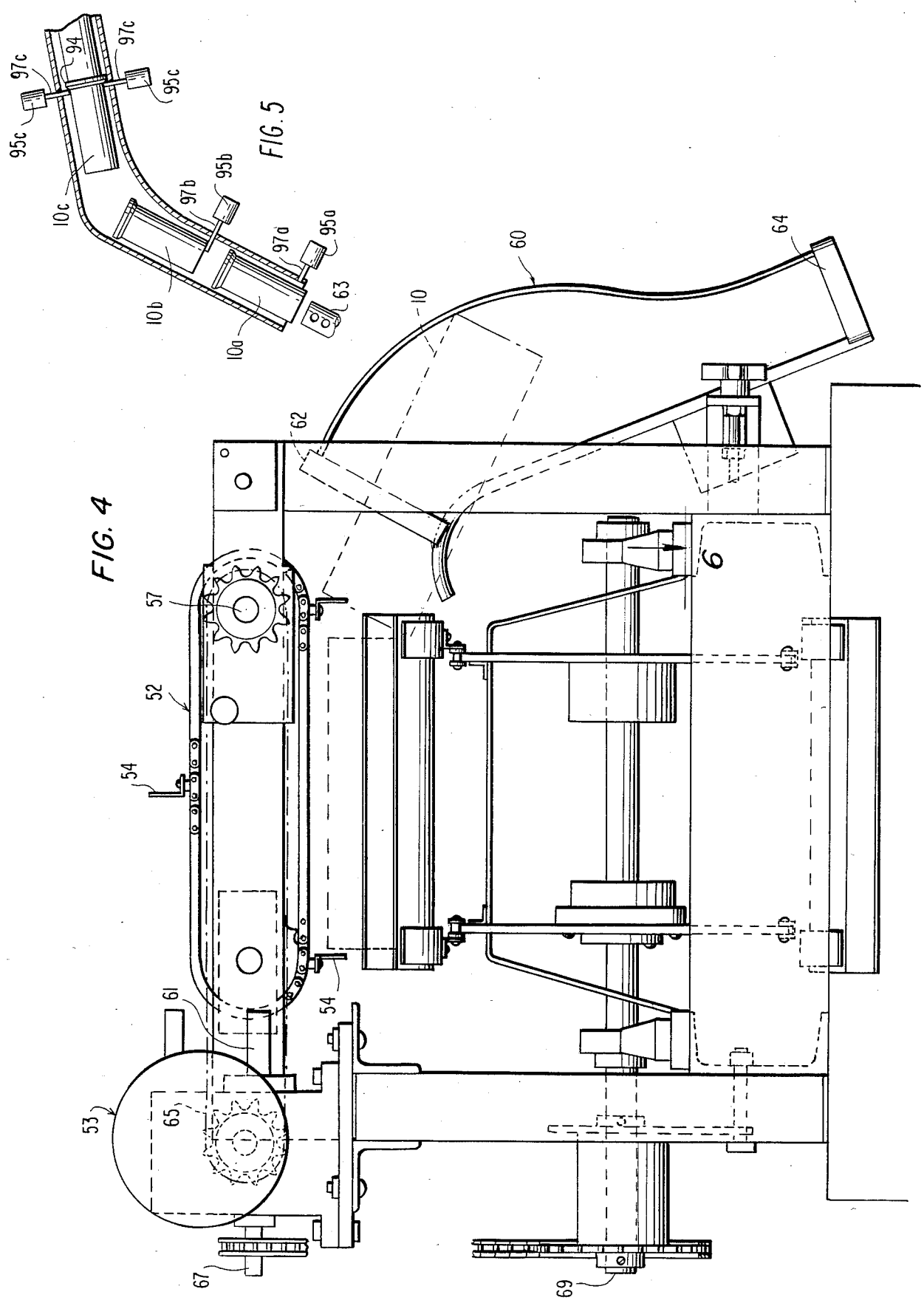

CONTAINER HANDLING SYSTEM

SUMMARY OF THE INVENTION

This invention relates to methods and apparatus for handling articles, especially containers. Modern high-speed packaging of numerous products requires the handling of cans or other containers to automatically load these items onto a packaging or feeding line in timed sequence. The problem of distributing cans at spaced-apart stations from a central supply has been approached from many directions; however, a need for economic article handling systems still exists.

In the present invention, a system is provided for receiving individual, elongated cylindrical containers or the like from a group of the containers onto a conveyor and indexing the conveyor for movement in time sequence to receive the essentially horizontally-oriented, individual containers and discharge them at spaced-apart locations during each loading-unloading cycle. The conveyor has a plurality of spaced-apart, container-holding carriers adapted for receiving and holding the containers in a substantially horizontal position along the path of the conveyor. The system is operated by moving the conveyor sequentially in a direction away from the group of articles being dispensed, while loading and holding individual containers in their respective carriers. The carriers are loaded individually by dropping containers from the group by gravity. The group can be physically supported by the article being dispensed, thereby avoiding the need for providing some type of moveable, mechanical cut-off structure to keep more than one article from being dispensed for each carrier passing beneath the group.

A dispensing assembly is provided in the invention for intermittently unloading a desired number of containers from the conveyor by pushing the containers in the indexed carrier in their horizontal direction toward a plurality of spaced-apart, receiving chutes mounted adjacent the conveyor and operatively connected to respective container feed lines to complete a handling cycle. In a preferred embodiment, the conveyor movement is interrupted momentarily when the loaded carriers are aligned with their respective receiving chutes to permit the containers to be pushed by a unitary dispensing pusher.

These and other features and advantages of the invention will be apparent from the following description and in the drawings wherein:

FIG. 4 is an end elevation view of the container handling system showing a pusher assembly and receiving chute;

FIG. 5 is a sectional view depicting an illustrative container handling sleeve suitable for incorporation into an apparatus in accordance with the present invention.

Figure 1:
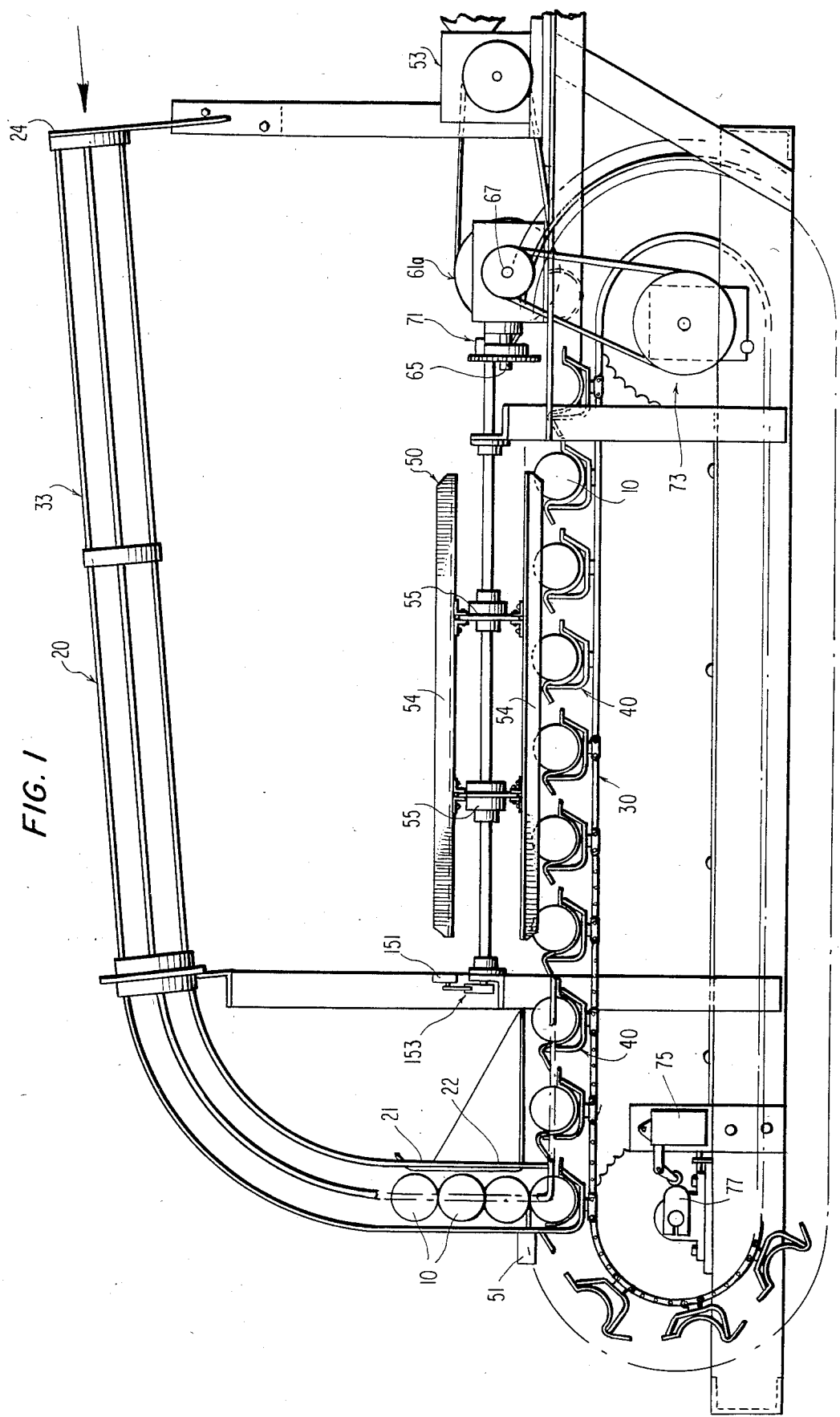
FIG. 1 is a side elevation view of a container handling system according to the present invention.

Referring to FIG. 1, there is shown an apparatus for receiving and unloading a series of containers in a cyclic manner to a packaging machine where the containers are arranged to receive goods for packaging. Each container 10 has one open end, the other end closed, and when a number of containers 10 are placed in the substantially vertical buffer chute 20, they are arranged in a horizontal disposition with the open end facing toward the direction of unloading to the packaging machine. Buffer chute 20 is positioned above conveyor 30 for delivering containers 10, often referred to as canisters, to container-holding carriers 40 as the latter are moved or indexed past discharge end 22 of the chute 20. Each container-holding carrier 40 is adapted for receiving and holding a container 10 in a horizontal position with the open end of each carrier disposed toward the unloading direction.

The carriers 40 have a greater dimension in the transverse direction of movement of conveyor 30 and are equally spaced from one another along substantially the entire length of the conveyor. For the purposes of discussion, the position held by each carrier 40 will be referred to as a station. Thus, during indexing, the conveyor is moved through a plurality of stations in a cycle. In the apparatus of FIG. 1 each indexing movement covers six stations. However, any other convenient number of stations can be covered during an indexing cycle so long as movement of other elements of the apparatus is modified accordingly.

Chute 20 includes a vertical portion 21 having a lower end 22 for discharging the containers 10 and an angular portion 33 at a slight angle to the horizontal with a receiving end 24 for receiving containers 10. The buffer chute 20 is located above the conveyor 30 with the discharge end 22 being adjacent the loading end of the conveyor. The buffer chute 20, which may be a solid enclosure or cage type, guides a vertical stack of single containers 10 toward the loading position where the carriers 40 are aligned with the bottom or discharge end 22 of the buffer chute 20. Sufficient clearance is allowed between the chute discharge 22 and conveyor 30 to permit a single container when in its receiving cradle to move laterally with the carrier towards the position for discharging containers from the conveyor. Each succeeding container is retained in the chute 20 until the preceding container has been conveyed away from the loading position toward its dispensing position or station along the horizontal path of the conveyor upper surface.

Figure 2:
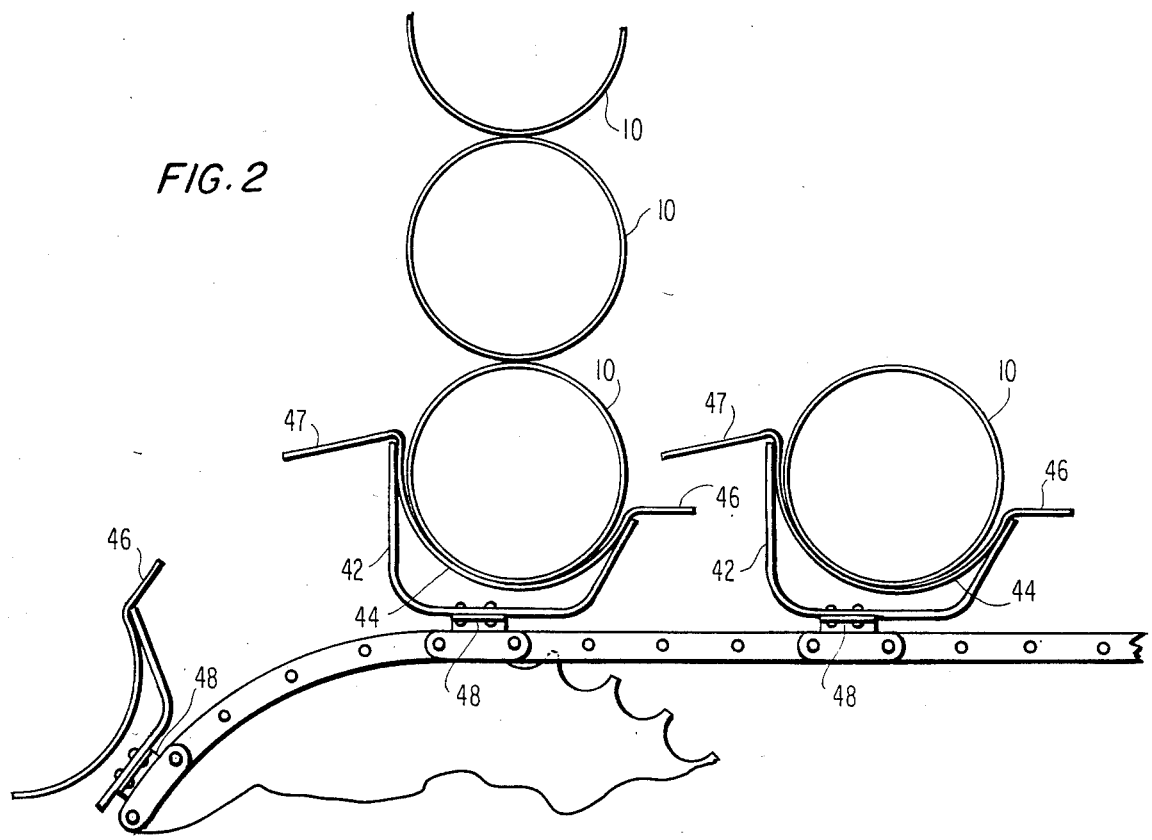
FIG. 2 is a detail side view of a portion of the system with a container loaded onto a carrier but still in contact with the group of containers.

Although carrier 40 may be formed in a single piece by casting, etc., the preferred apparatus shown in FIG. 2 is an assembly employing a U-shaped frame portion 42 having attached thereto a carrier cradle portion 44, which may be of substantially semicircular or other cross-section having a width that is slightly larger than that of the article being carried. A forward extension or projection 46 of cradle 44 forms the leading edge of the carrier 40. The downwardly sloped, rearward extension 47 of cradle 44 serves as a guide for the next container. The cradle portion 44 and extensions 46, 47, preferably are formed of a single sheet of metal or the like, and are attached by welds, screws, or other suitable fastening means to their respective frame element 42. The carriers 40 are attached to the conveyor by mounting brackets 48 with the axis of the carrier being in a plane parallel to the width of the conveyor, but transverse to the path of movement of the conveyor. The mounting brackets 48 can form an integral part of the links of a sprocket-type conveyor or be separable therefrom.

Figure 3:
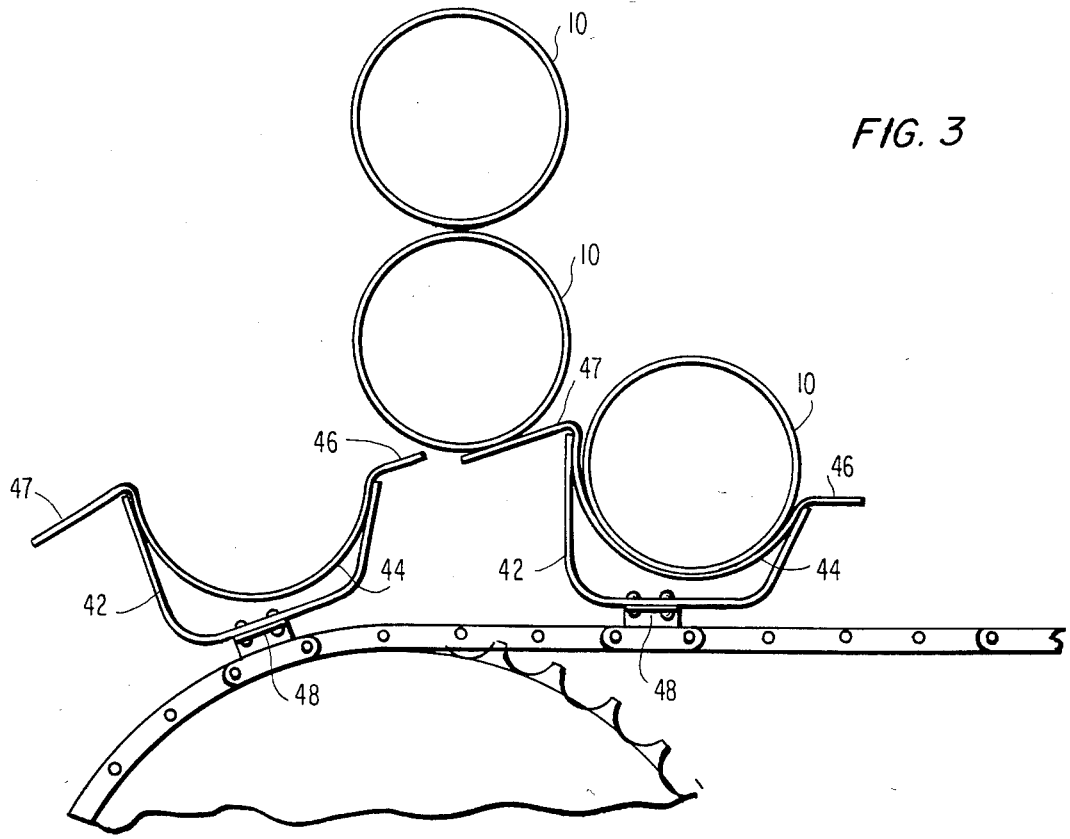
FIG. 3 is a detail side view similar to FIG. 2 but showing a container being dispensed in contact with the rear portion of the carrier holding the next previously dispensed container.

Since each carrier is constructed with a raised platform guide or rear extension portion 47, each succeeding container being dispensed is permitted to drop by gravity from chute 20 a distance which is only a fraction of its diameter as the carrier travels between stations, as shown in FIG. 3. As the respective carrier 40 for a given container moves to the receiving position and becomes vertically-aligned with the buffer chute 20, the container 10 drops over the lower leading edge 46 into the central cradle portion 44 of the carrier 40. Even when the cradle portion 44 is fully registered with the chute discharge 22, and the container 10 is dropped into position within cradle portion 44 the lowest container supports the next succeeding container 10 and others in the vertical stack.

Preferably, the rear guide or extension 47 extends from the cradle portion 44 (or a carrier frame) at a vertical point between the center and top of the container when carried in the cradle portion 44. At this vertical point, the succeeding container 10 may slip or roll down the trailing side of the preceding container onto the rear guide 47 with only a slight bump, and then downwardly onto lower front leading edge or lip 46 of the next succeeding cradle. The cradle portion 44 may be a rounded channel, or it may have a rectilinear or other shape. Also, the containers need not be cylindrical although such are preferred, especially circular cylinders.

The relative dimensions of the carrier structure may be varied considerably. For instance, where the articles are to be dispensed at a spacing of 1½ to 2 article widths between carrier centers, the carriers may be provided with a relatively short leading edge extension 46. The length of the rear extension 47 may be at least about ½ the article width or more, depending upon the overall distance between carriers. Greater lateral spacing between dispensed containers may require the extensions to be longer. The leading edge of one carrier may cooperate with or underlie the trailing edge of the preceding carrier to downwardly form a generally sloped support for the container. The leading edge of extension 46 is disposed below the lower end of the rear extension 47 of the preceding, adjacent carrier to insure that the containers fall properly from the chute into the succeeding carrier, however, the leading edge and rear extension could be substantially even and proper delivery would be achieved.

In the embodiment shown, sprocket links fabricated with four links between each carrier link from the conveyor 30. This is exemplary only, and any suitable flexible conveyor arrangement can be employed such as a continuous conveyor belt of woven metal, rubber, or fabric provided with means for mounting the carriers.

Although the configuration and location of the carriers, conveyor and upper gravity chute 20 as shown in the drawings are such that one container is dispensed for each carrier passing beneath chute 20. A solenoid catch 51 can be positioned inside buffer chute 20 adjacent discharge portion 22 to provide for a preselected number of containers to be fed to carriers 40 during an indexing cycle. In this particular embodiment, solenoid 51 is integrated with a timing sequence system to allow only six containers 10 to pass through the discharge end 22 during each indexing operation. After the six containers have passed to the carriers 40, the solenoid becomes actuated to prevent further movement of a subsequent container until the indexing operation has been completed. At the initation of another cycle, solenoid 51 is actuated to an open position to allow delivery of six more containers for the next cycle.

As described earlier, the preferred configuration of the apparatus is one which provides for the stack of containers in chute 20 to be held by the containers in the carrier 40 beneath outlet 22 of chute 20 to supply one container into each carrier as it moves past the discharge point 22 during a simple indexing of the conveyor during which a plurality of carriers pass beneath outlet 22. However, solenoid 51 can be operated to hold each succeeding container until a carrier 40 is registered directly beneath discharge end 22 at which point solenoid 51 would be actuated to release one container 10. In such case each indexing movement of the conveyor would involve a distance corresponding to that between the vertical centerlines of adjacent containers. With this type of solenoid operation, the configuration of leading and trailing edges 46, 47, respectively, as described above need not be included as solenoid latch 51 alone will be sufficient to prevent the dropping of a container from chute outlet 22 into a position between adjacent carriers 40.

The system is provided with means for moving the conveyor unidirectionally. The conveyor advances the containers in such a way that their cylindrical axes are substantially perpendicular or normal to the direction of movement and the articles are generally parallel to one another. Simultaneous pushing of a plurality of containers is achieved by pusher assembly 50 mounted above the conveyor with each bar 54 extending parallel to the path of conveyor for lateral movement transverse to that of the conveyor 30, whereby a plurality of the containers are contacted at their closed end with the laterally-moving pusher bar 54 and urged from their respective carriers into their respective receiving chutes 60. Preferably, the pusher assembly 50 urges the containers 10 in a direction that is substantially normal to the direction of the linear movement of the conveyor. The dispenser section is preferably constructed as a single pusher for the same number of containers filled during a single indexing movement of the conveyor. Likewise, simultaneous ejection or dispensing of a plurality of containers from their carriers may be achieved with a series of individual pushing members. The dispenser pusher assembly 50 may be powered by an electrical motor, hydraulic servomechanism, solenoid, etc.

To move conveyor 30 and pusher bar 54, a motor 53 is incorporated in a power transmitting system and a timing sequence system to index the various components of the apparatus through a repeating cycle. More specifically, the dispensing pusher bar 54 is rotated by a dual chain belt and sprocket system 55 that in turn rotates around driven shaft 57 and idler shaft 59. As can be seen in viewing FIGS. 1 and 4, motor 53 drives drive shaft 61 in a gearbox 61a. Gearbox 61a in turn has two driven shafts 65 and 67 for driving, respectively, the driven shaft 57 and the indexing shaft 69 of conveyor belt 30. Electronic clutch brakes 71 and 73 are provided on the driven shaft 57 of the pusher bar 54 and on the indexing shaft 69 of main conveyor 30 to control the relationship between the movement of the main conveyor 30 and dispensing pusher bar assembly 50. Each clutch brake 71, 73 is in turn actuated through an electronic timing switch 75 by cam 77. In this way, the electric motor 53 is able to drive both main conveyor 30 and dispensing pusher bar assembly 50.

In the operation shown, conveyor 30 can be indexed six stations at a time, during which each of six carriers 40 will receive a container 10 from discharge end 22 of buffer chute 20. When six of the carriers 40 are aligned with pusher bar assembly 50 as shown in FIG. 1, the pusher bar will be automatically actuated to move six containers 10 from carriers 40 to their respective receiving chutes 60 and to a packaging machine. Preferably, a given receiving chute 60 of the handling machine is integrated with a control sleeve 93 for controlling the movement of containers 10 toward the packaging apparatus once the container has been dispensed from the indexing conveyor as discussed above.

As shown in the preferred embodiment, the dispensed containers 10 after having been ejected from their carriers 40 then travel by gravity in receiving chutes to their respective feeding lines. A suitable feeding line for use herewith is disclosed in U.S. Pat. No. 4,052,838, assigned to the assignee of this application, and incorporated herein by reference. The receiving chute 60 shown in FIG. 4 is a cage-type chute having an open receiving end 62 for entry of containers 10 pushed from the conveyor 30 at their respective dispensing positions. These chutes 60 receive the individual containers and guide their gravity descent to the bottom 64 where they are discharged onto the feeding line.

Referring to FIG. 5, a container-receiving member 63 can be operatively positioned opposite the lower end of the feed line chute 93. Member 63 may be one of a plurality of such members disposed on a rotary hub and moved in sequence with the conveyor dispensing function.

One advantage of the unitary pusher assembly as shown in FIG. 4 is the relatively short time period required for dispensing a plurality of articles from the conveyor into the receiving chutes. The preferred pusher assembly has only one travel direction. Thus, a plurality of sequentially-acting pusher elements can be provided by mounting pusher bars 54 on a separate endless conveyor unit 52, which may be driven by a separate power unit or connected to the main conveyor drive system. A mechanism having at least two pusher bars spaced-apart somewhat more than the length of the containers being pushed provides satisfactory handling capacity at good handling speeds. Since the endless conveyor unit 52 has a plurality of pusher bars 54 mounted at spaced-apart positions, no retraction time is necessary as in other devices, such as rams, etc. Once a prior pusher bar 54 has cleared the path of travel for the containers, the conveyed articles can be pushed by the next bar 54 freely along their horizontal path during each unloading cycle. The next pusher bar is then in position to push the succeeding set of cylindrical containers. The pusher bars 54 are advanced one rotational direction to be aligned for cyclic-operation. Container 10 is shown in dashed line at the end of the sweeping motion of the pusher bar 54. The container enters chute 60 at the enlarged upper inlet portion 62 and drops through the chute to outlet end 64, where it is passed to a receiving member 63 via a handling sleeve 93 which controls movement to receiving member 63.

Operation of the container discharging unit depicted in FIG. 5 is fully described in said U.S. Pat. No. 4,052,838 which is included herein by reference. In the device of the patent, a plurality of container-receiving members are mounted on a rotary hub operatively connected to receive containers 10 from the conveyor handling system of FIGS. 1 and 4 through chute 60. This unit is one of a predetermined number of packaging units, corresponding to the number of containers dispensed by each pusher bar 54 during one container-dispensing movement across conveyor 30. The hub member is rotated by drive means in time sequence with conveyor 30 and the pusher assembly to position one of the receiving members 63 at the outlet end of chute 60 to receive the discharged container 10. In the particular packaging unit shown, stacked items such as farinaceous food chips are fed to the receiving member 63. This unit includes apparatus for dropping a container 10 over a receiving member 63 containing a charge of nested, uniformly-shaped articles and subsequently discharging the container filled with the articles.

By way of example, FIG. 5 depicts an illustrative container control sleeve 93 having an outlet adjacent the container receiving position of receiving member 63. A solenoid-operated catch member 95(a) is positioned to extend its plunger 97(a) adjacent the outlet of sleeve 93 to intersect the path of travel of containers 10 therein so that when catch member 95(a) is in its non-actuated condition, plunger 97(a) prevents passage of containers from sleeve 93. Similarly, solenoid-operated catch member 95(b) is positioned to extend its plunger 97(b) into the path of travel of containers 10 at a point upstream from catch member 95(a) sufficient to permit one container 10(a) to be held between catch members 95(b) and 95(a). Canister 10(b) is held by plunger 97(b) when the latter is in the non-actuated position. Solenoid-operated catch members 95(c) are positioned to hold one container 10(c) immediately behind canister 10(b). Preferably, catch members 95(a) and 95(b) extend into the path of container travel within sleeve 93 a sufficient distance to block the passage of the leading end of the container therein, while catch members 95(c) extend from opposite sides of sleeve 93 only a distance sufficient to catch rim 94 on the trailing end of a container 10(c). With container 10(a) held by catch member 95(a), container 10(b) held by catch member 95(b), container 10(c) held by catch member 95(c), and one or more other containers held by and behind container 10(c), a receiving member 63 filled with a nested stack of uniformly-shaped articles such as curved food chips 31, moves to the container receiving position by rotation of a hub member (not shown) on which a plurality of receiving members 63 are mounted in a spaced-apart relationship. Solenoid-operated catch members 95(a) is then actuated to withdraw its plunger 97(a) from a path of travel of canister 10(a) within sleeve 93, as depicted in FIG. 5. Container 10(a) then moves onto the filled receiving member 63. Catch member 95(a) is then deactivated to again extend its plunger 97(a), following which, catch member 95(b) is actuated to withdraw its plunger 97(b), allowing container 10(b) to move forward until it is restrained by catch member 95(a). Catch member 95(b) is then deactivated, after which catch members 95(c) are actuated to release container 10(c) to catch member 95(b). As container 10(c) advances, container 10(d) behind it also advances, and after rim 94 of container 10(c) and the leading end of container 10(d) have cleared catch members 95(c), those catch members are deactivated to extend their plungers 97(c) so that plungers 97(c) ride against the outer surface of container 10(d) as it advances. Plungers 97(c) thus catch container 10(d) by its rim that is similar to rim 94 of container 10(c). The advancement of canisters 10(b), 10(c), 10(d), etc., takes place after hub member has been rotated to bring another filled receiving member 63 to the container-receiving position. Thus, when that filled receiving member 63 is at the container-receiving position, a container 10(a) is available at the outlet of sleeve 93.

Figure 6:
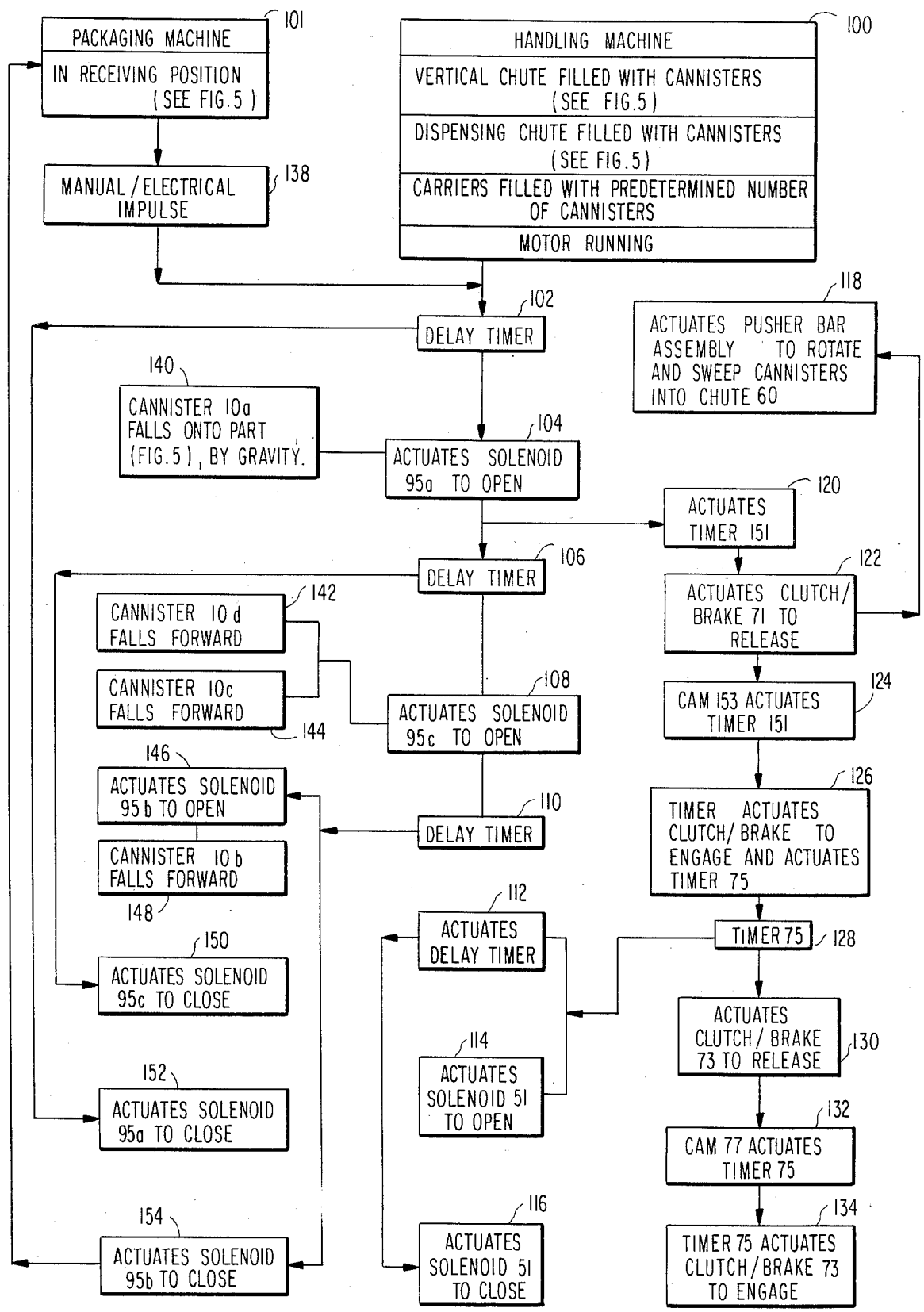
FIG. 6 is a timing sequence for the container handling system to pass containers from the conveyor to a rotary hub packaging device.

An actual timing sequence for movement of the various elements of the apparatus in conjunction with the package machine is set out in FIG. 6. Any convenient electronic or other electro-mechanical combination can be employed to achieve the sequence of events shown.

Initially, the handling machine is placed in operation by insuring that buffer chute 20 is filled with containers 10 and, similarly, the dispensing chute 93 is also filled with containers 10 at each position held in place by plungers 97(a), 97(b), and 97(c). The packaging machine is placed in the receiving position, the packaging machine is integrated with the handling machine 100 through a manual or electrical impulse source 138 to initiate operation of a delay timer 102. Delay timer 102 operates solenoid 95(a) to open, as at 104, and close, as at 152, as described above. This delay timer is integrated with other delay timers 106 and 110 to operate other solenoids in the movement of the canisters through dispensing chute 93 as described above and as indicated at positions 108, 142, 144, 150 and 146, 148, 154 of FIG. 6.

Simultaneously with the initial actuation at position 104 to open solenoid 95(a), the timer 151 is actuated as indicated at 120. As a result, the clutch brake 71, as shown in position 122, is released by the timer which in turn actuates pusher bar assembly 50 to rotate and sweep one group of containers 10 into their respective chutes 60. This sweeping motion causes cam 153 in turn to actuate timer 151, indicated at 124. This results, at 126, in the actuation of clutch brake 71 to engage and stop the sweeping motion and simultaneously to actuate timer 75. As indicated at 128, timer 75 actuates clutch brake 73 to release allowing conveyor 30 to be indexed through six (6) stations to receive containers 10 from the buffer chute 20 and move six in line with the pusher bar assembly 50. Delay timer as shown at 112 is integrated with timer 75 and solenoid 51 such that the solenoid 51 is actuated to the open position as shown at 114 at the beginning of each indexing cycle. The conveyor continues movement through an indexing cycle until the timer switch is actuated by cam 77 indicated at 132 at which point the timer 75 actuates clutch brake 73 to stop the movement of the conveyor. Substantially, simultaneously with the actuating clutch brake 73 delay timer 112 actuates solenoid 51 to close at 116 thereby preventing any further delivery of containers 10 from chute 20 to canisters 40 until the next indexing operation is initiated. When the conveyor is stopped, there will be six containers aligned with pusher bar assembly 50. In this position, delay timer 102 is again actuated to operate the solenoids in the dispensing chute as well as the timer 151 which initiates movement of the pusher bar assembly 50, and the system repeats itself again.

Solenoid 51 may include a manual override to maintain the solenoid in a closed position regardless of signals from delay timer 112 or timer 128. With such an override provision various maintenance or other tasks can be performed on the machine without having to withdraw completely all containers 10 from chute 20. Otherwise, the delivery of containers 10 could interfere with these tasks.

The above description is for a preferred embodiment. Other embodiments, of course, will come within the full scope of the invention.

What is claimed is:

1. A container handling system for distributing a plurality of tubular containers from a source to a plurality of receivers comprising:
   (a) a holding chute for holding and discharging tubular containers;
   (b) an indexing conveyor positioned to receive containers from the holding chute and align a plurality of containers for delivery;
   (c) a plurality of recivers positioned adjacent the conveyor to receive containers from said conveyor;
   (d) a plurality of container carriers positioned on the conveyor at spacing corresponding to the spacing between said recivers;
   (e) said container carriers being configured to individually receive and carry a container dispensed thereto from said chute, said carriers having means for preventing containers from being dispensed to a position between adjacent carriers and for retaining a subsequent container in position for dispensing into a subsequent carrier;
   (f) means for intermittently moving said conveyor to pass a plurality of said carriers past the discharge of said holding chute to position a container discharged from said holding chute in the respective carriers;
   (g) means for stopping said conveyor in a position in which a plurality of said carriers holding a container are adjacent a corresponding plurality of said receivers; and
   (h) means for moving a plurality of said containers from their carriers to said respective receivers.

2. The container handling system according to claim 1, wherein said conveyor comprises a motor-driven sprocket chain; a plurality of mounting brackets fixed to said sprocket chain at spaced intervals for mounting said container carriers thereon; and at least one pusher bar movably mounted parallel to the path of movement of said conveyor and operatively connected to push said predetermined number of containers horizontally therefrom.

3. The container handling system according to claim 1, wherein said means for preventing containers from being dispensed to a position between adjacent carriers and for retaining subsequent container in position for dispensing into a subsequent carrier comprises a rear guide member, and a leading edge member extending forwardly from said carrier in a direction opposite to that of said rear guide member, said rear guide member having a downward and rearward slope toward the leading edge member of a succeeding carrier, said carriers with said rear guide member and said leading edge cooperating with said holding chute to permit delivery of a container from said chute to a carrier is indexed past said chute.

4. The container handling system according to claim 1, wherein said holding chute includes a discharge end and is configured to pass containers by gravity from said chute to carrier registered with said discharge end.

5. A container handling system for distributing a plurality of elongated cylindrical articles from a source comprising:
   (a) holding means for holding articles in a stack;

(b) an indexing conveyor positioned during a movement to receive a plurality of individual articles from a stack of said articles and adapted to align a plurality of articles for intermittent unloading of a plurality of said articles from said conveyor when the latter is stationary;

(c) a plurality of article carriers on the conveyor;

(d) means for indexing said conveyor to register in sequence a plurality of said carriers with said stack during said indexing;

(e) said holding means including means for delivering an article to a carrier registered with said stack while preventing subsequent articles in said stack from being delivered therefrom to said conveyor; and (f) said article carriers being configured to individually receive and carry an article dispensed thereto from said stack, said carriers having means for preventing articles from being dispensed to a position between adjacent carriers and for retaining a subsequent article in position for dispensing into a subsequent carrier.

6. The container handling system according to claim 5 wherein said means for preventing articles from being dispensed to a position between adjacent carriers and for retaining subsequent articles in position for dispensing into a subsequent carrier includes for said carriers a leading edge member extending forwardly from said carriers toward a preceding carrier and a rear guide member extending rearwardly from said carriers toward a succeeding carrier.

7. The container handling system according to claim 6 further comprising pusher means for pushing containers from said article carriers, wherein said indexing means includes means for stopping said conveyor to align a plurality of said carriers adjacent to said pusher means, and sequencing means for actuating said pusher means after at least one carrier has been aligned therewith.

* * * * *